United States Patent [19]

Deubzer et al.

[11] 4,301,215

[45] Nov. 17, 1981

[54] PROCESS FOR THE PREPARATION OF IMPREGNATED WOOD

[75] Inventors: Bernward Deubzer, Burghausen; Erich Brunner, Gmunden; Herman Wilhelm, Braunau; Konrad Sallersbeck, Burghausen, all of Fed. Rep. of Germany

[73] Assignee: Wacker-Chemie GmbH, Munich, Fed. Rep. of Germany

[21] Appl. No.: 116,125

[22] Filed: Jan. 28, 1980

[30] Foreign Application Priority Data

Jan. 30, 1979 [DE] Fed. Rep. of Germany ....... 2903376

[51] Int. Cl.³ .............................................. B32B 9/04
[52] U.S. Cl. ................................... 428/447; 427/297; 427/387; 528/17
[58] Field of Search ............... 427/387, 393, 440, 297; 428/447; 106/287.13, 287.14, 287.15, 287.16; 8/116 R; 528/32, 17

[56] References Cited

U.S. PATENT DOCUMENTS 3,445,265 5/1969 Bentley et al. .................. 427/387 X

FOREIGN PATENT DOCUMENTS 537815 5/1977 U.S.S.R. .............................. 427/297

*Primary Examiner*—Ronald H. Smith
*Assistant Examiner*—Thurman K. Page

[57] ABSTRACT

A process for preparing plastic wood which comprises impregnating wood with a mixture containing (1) an organopolysiloxane having groups which are capable of condensation and/or containing SiC-bonded alkenyl group having an average molecular weight of at least 500 when the organopolysiloxane contains from 0.5 to 1.89 SiC-bonded organic radicals for each silicon atom and when the organopolysiloxane (1) contains from 1.90 to 2 SiC-bonded organic radicals for each silicon atom, then the average molecular weight is at least 20,000 and (2) an organic silicon compound having at least three groups which are capable of condensation and/or atoms capable of condensation and a maximum of 10 silicon atoms per molecule; and other substances if desired; and thereafter crosslinking the organopolysiloxane (1) having groups capable of condensation and/or containing SiC-bonded alkenyl groups, which is present in the wood.

7 Claims, No Drawings

PROCESS FOR THE PREPARATION OF IMPREGNATED WOOD

The present invention relates to plastic wood, particularly wood which has been impregnated with silicon compounds and more particularly to a process for impregnating wood with organosilicon compounds.

BACKGROUND OF INVENTION

Plastic wood has been described in, for example, Kirk-Othmer, "Encyclopedia of Chemical Technology", Second Edition, Volume 22, 1970, page 381; or "Ullmanns Encyklopaedie der technischen Chemie", Fourth Edition, Volume 12, Weinheim, 1976, page 724, in which wood is treated with a non-swelling vinyl-type monomer and cured by radiation or by heat and a catalyst. Moreover, it is known that wood may be impregnated with a monomer such as methacrylate ester or a prepolymer, such as a methacrylate ester prepolymer and thereafter the methacrylate ester monomer or prepolymer is polymerized.

In comparison to the plastic wood prepared heretofore, the plastic wood prepared in accordance with the process of this invention has the advantage that it is more resistant to water and ultraviolet light.

Therefore, it is an object of this invention to provide plastic wood having improved resistance to water. Another object of this invention is to provide plastic wood having improved resistance to ultraviolet light. A further object of this invention is to provide a process for preparing plastic wood by impregnating wood with silicon compounds to improve its resistance to water and ultraviolet light.

SUMMARY OF INVENTION

The foregoing objects and others which will become apparent from the following description are accomplished in accordance with this invention, generally speaking, by providing a process for preparing plastic wood which comprises impregnating wood with a mixture containing (1) an organopolysiloxane having groups which are capable of condensation and/or contain SiC-bonded alkenyl groups and have an average molecular weight of at least 500 when the organopolysiloxane has from 0.5 to 1.89 SiC-bonded organic radicals for each silicon atom, and when the organopolysiloxane contains from 1.90 to 2 SiC-bonded organic radicals for each silicon atom, then the average molecular weight is at least 20,000 and (2) an organic silicon compound having at least 3 groups which are capable of condensation and/or atoms capable of condensation, and a maximum of 10 silicon atoms per molecule, and other substances if desired, and thereafter crosslinking the organopolysiloxane (1) containing groups that are capable of condensation and/or contain SiC-bonded alkenyl groups, which is present in the wood.

DETAILED DESCRIPTION OF INVENTION

The organopolysiloxane (1) which has groups that are capable of condensation and/or contain SiC-bonded alkenyl groups used in the process of this invention, i.e., the crosslinkable organopolysiloxane, preferably contains monoorganosiloxane units and/or diorganosiloxane units, and triorganosiloxane units. Other units which may be present are $SiO_{4/2}$ units, and/or siloxane units having one Si-bonded hydrogen atom.

The monoorganosiloxane units can be represented by the formula $RSiO_{3/2}$, the diorganosiloxane units by the formula $R_2SiO$, and the triorganosiloxane units can be represented by the formula $R_3SiO_{\frac{1}{2}}$. In all of these formulas, R which may be the same or different, represents monovalent hydrocarbon radicals and substituted monovalent hydrocarbon radicals. These organic radicals preferably contain from 1 to 12 carbon atoms. Siloxane units having one Si-bonded hydrogen atom can be represented by the general formula $R_aHSiO_{3-a/2}$, where R is the same as above and a is 0, 1 or 2.

Examples of hydrocarbon radicals represented by R which are present in the organopolysiloxane (1) having groups which are capable of condensation and/or contain SiC-bonded alkenyl groups are alkyl radicals such as methyl, ethyl, n-propyl, isopropyl, n-butyl and sec-butyl radicals, as well as the octyl and dodecyl radicals; cycloalkyl radicals such as the cyclopentyl, cyclohexyl and cycloheptyl radicals; alkenyl radicals such as vinyl and allyl radicals; aryl radicals such as the phenyl radical, alkaryl radicals such as the tolyl radicals; and aralkyl radicals such as the benzyl radical. Examples of substituted hydrocarbon radicals represented by R are halogenated hydrocarbon radicals, such as the 1,1,1-trifluoropropyl radical and a,a,a-trifluorotolyl radicals as well as the chlorophenyl and dichlorophenyl radicals. It is, however, preferred that at least 50 percent of the radicals be methyl radicals since they are readily available.

Condensable groups which may be present on the organopolysiloxane (1) are preferably Si-bonded hydroxyl groups and/or SiOC-bonded alkyl groups having from 1 to 8 carbon atoms, and more preferably alkyl groups having from 1 to 3 carbon atoms. The alkyl groups having from 1 to 8 carbon atoms are the same alkyl groups cited for R above.

Preferred SiC-bonded alkenyl groups which may be present on the organopolysiloxane (1) are vinyl groups.

It is preferred that the organopolysiloxane (1) having groups capable of condensation and/or containing SiC-bonded alkenyl groups and having from 0.5 to 1.89 SiC-bonded organic radicals for each silicon atom, especially those containing at least 40 mole percent of monoorganosiloxane units, have a maximum average molecular weight of 4,000. Organopolysiloxanes having from 1.90 to 2 SiC-bonded organic radicals for each silicon atom, preferably have a maximum average molecular weight of 500,000. The average molecular weight of the organopolysiloxane (1) having groups which are capable of condensation and/or containing SiC-bonded alkenyl groups may be higher as long as the mixture containing the organopolysiloxane (1) and organic silicon compound (2) having a maximum of 10 silicon atoms per molecule and at least three groups capable of condensation and/or atoms capable of condensation has a sufficiently low viscosity that under the pressure and temperature conditions used, the wood can be satisfactorily impregnated in the absence of, or at least in the presence of not more than about 5 percent by weight of solvent based on the total weight of the mixture. Mixtures of different organopolysiloxanes, e.g., those having different degrees of polymerization and/or different degrees of substitution, and having groups which are capable of condensation and/or containing SiC-bonded alkenyl groups that are capable of being crosslinked, can be used.

Examples of organic silicon compounds (2) having at least three reactive groups, i.e., condensable groups and/or condensable atoms and a maximum of 10 silicon atoms per molecule are alkyl silicates, particularly those of the general formula Si(OR')$_4$, where R' is an alkyl radical having from 1 to 4 carbon atoms, such as tetraethoxysilane, alkylpolysilicates such as "Ethyl Silicate 40", i.e., an ethyl polysilicate having an SiO$_2$ content of about 40 percent by weight, and isopropyl silicates; trialkoxysilanes, particularly those of the general formula RSi(OR')$_3$, wherein R and R' are the same as above, such as methyltriethoxysilane and methylbutoxydiethoxysilane; partial hydrolyzates of methyltriethoxysilane having an SiO$_2$ content of 60 percent by weight; and methylhydrogenpolysiloxanes.

Mixtures of various organic silicon compounds (2) having at least three condensable groups and/or condensable atoms and a maximum of 10 silicon atoms per molecule can be used.

Preferably the organic silicon compound (2) having at least three condensable groups and/or condensable atoms and a maximum of 10 silicon atoms per molecule may be present in an amount of from 1 to 99 percent by weight, and more preferably from 30 to 75 percent by weight based on the total weight of the organosilicon compound (2) and organopolysiloxane (1) having condensable groups and/or containing SiC-bonded alkenyl groups.

Any wood which could have been used heretofore in the preparation of plastic wood can also be used in this invention. Examples of such woods are red beech, common beech, poplar, maple, birch, alder, European spruce, pine, larch and oak. The wood can be present in the form of lumber or in the form of timber products, particularly particle board or fiber board.

The wood can be impregnated with the mixture of organosilicon compounds, e.g., organopolysiloxane (1) and organic silicon compound (2) by dipping or by the same techniques which have been used heretofore to impregnate wood with aliphatic monomers containing multiple bonds and/or prepolymers and/or wood preservatives. The pressure of the surrounding atmosphere, i.e., about one bar, can be used. However, the use of higher pressures and/or lower pressures is preferred.

The organopolysiloxane (1) having condensable groups and/or containing SiC-bonded alkenyl groups is preferably cross-linked in the wood at a temperature of from 20° to 175° C.

When the organopolysiloxane (1) contains condensable groups, i.e., it has an Si-bonded hydroxyl group in each terminal unit of the molecule, and contains from 1.9 to 2 SiC-bonded organic radicals for each silicon atom, or if it has at least 0.01 percent by weight of condensable groups, i.e., Si-bonded hydroxyl groups, and contains fewer than 1.9 SiC-bonded organic radicals for each Si atom, then it is preferred that the mixture containing the organopolysiloxane (1) and organic silicon compound (2) having at least three condensable groups and/or condensable atoms and a maximum of 10 silicon atoms per molecule also contain a condensation catalyst.

Examples of suitable condensation catalysts are organic compounds such as acylates, alcoholates and chelates, particularly acetylacetonates, of the second, third, and/or fourth elemental groups of the Mendeleef Periodic Table, and of the first to eighth sub-groups of said table; and the lanthanide series. Preferred catalysts are the acylates, alcoholates and chelates of B, Pb, Al, Zn, Co, Ti or Sn. Specific examples of preferred condensation catalysts are lead-2-ethylhexoate, lead naphthenate, zinc naphthenate, zinc 2-ethylhexoate, tin 2-ethylhexoate, dibutyltin diacetate, dibutyltin dilaurate, cobalt-2-ethylhexoate, cobalt naphthenate, aluminum naphthenate, aluminum triacetylacetonate, aluminum isopropoxide, and polymeric butyl titanate. Examples of other condensation catalysts are ferric naphthenate, calcium naphthenate, cerium naphthenate and cerium 2-ethylhexoate. Additional examples of condensation catalysts are quaternary ammonium compounds such as tetramethylammonium hydroxide.

Mixtures of different condensation catalysts may also be used.

Some of the condensation catalysts cited above, such as compounds of boron, tin and titanium also act as wood preservatives.

The condensation catalysts are preferably used in amounts of from 0.001 to 3 percent by weight based on the total weight of all the organosilicon compounds.

If the organopolysiloxane (1) contains alkenyl groups as the only reactive groups, the mixture of such organopolysiloxane (1) and organic silicon compound (2) having at least three condensable groups and/or condensable atoms and a maximum of 10 silicon atoms, must contain at least one organosilicon compound having at least 3 Si-bonded hydrogen atoms per molecule, such as methylhydrogenpolysiloxane, and must contain a catalyst which promotes the addition of Si-bonded hydrogen to Si-bonded alkenyl groups. An organosilicon compound having at least 3 Si-bonded hydrogen atoms is preferably used in an amount such that from 0.1 to 15 Si-bonded hydrogen atoms are present for each Si-bonded aliphatic multiple bond.

Examples of catalysts which promote the addition of Si-bonded hydrogen to Si-bonded alkenyl groups are compounds or complexes of platinum such as platinum-olefin complexes. Such catalysts are preferably used in amounts of from 0.5 to 500 ppm by weight, calculated on the weight of elemental platinum, and based on the total weight of all the organosilicon compounds present in the composition.

In addition to the above described organosilicon compounds or organosilicon compound and organic silicon compounds having high and low molecular weights, as well as the condensation or addition catalysts, the mixture used in accordance with this invention for the preparation of plastic impregnated wood can contain other substances such as insecticides, fungicides, bactericides, stabilizers, accelerators, inhibitors, and fire-proofing agents.

The impregnated wood prepared in accordance with this invention can be used as structural materials for buildings, in machine construction, in land vehicles, ships and aircraft, and for the manufacture of musical instruments.

In the following examples, all percentages are by weight, unless otherwise specified.

Example

Small boards 140 mm × 90 mm × 15 mm composed of spruce, beech and linden are immersed at the same time in a mixture containing 30 percent of a methylpolysiloxane consisting of 95 mole percent of monomethylsiloxane units and 5 mole percent of dimethylsiloxane units and having 1 percent of Si-bonded hydroxyl groups and 3 percent of Si-bonded ethoxy groups with a softening point of 55° C. and an average molecular weight of 3,000, and 70 percent of a partial hydrolyzate of methyltriethoxysilane containing 40 mole percent of Si-bonded ethoxy groups with a viscosity of 20 mm$^2$s$^{-1}$ at 25° C. and an average of 5 silicon atoms per molecule, to which 0.5 percent by weight of dibutyltin dilaurate had been added. By reducing the pressure in the immersion tank to about 16 mbar and allowing the pressure to rise again to approximately 1 bar, a thorough impregnation of the boards was accomplished. After removing the impregnated boards from the tank, they were stored for 24 hours at room temperature and were then heated for 2 hours at 70° C., 2 hours at 90° C. and finally 2 hours at 110° C. The weight increase of the boards resulting from this treatment amounted to 1 percent for the spruce, 59 percent for the beech and 36 percent for the linden. The same ratio of silicon to tin was found by spectral analysis to be present in the sawdust from the interior of each treated board as in the mixture used for the impregnation, which shows that the boards were completely impregnated.

What is claimed is:

1. A process for preparing plastic wood which consisting essentially of impregnating wood with a mixture containing (1) an organopolysiloxane having a ratio of SiC-bonded organic radicals per silicon atom of from 1.9 to 2 when the average molecular weight of the organopolysiloxane is at least 20,000 and when the average molecular weight of the organopolysiloxane is at least 500, the ratio of SiC-bonded organic radicals per silicon atom is from 0.5 to 1.89, said organopolysiloxane containing reactive groups selected from the class consisting of condensable groups, SiC-bonded alkenyl groups and mixtures thereof, and (2) an organic silicon compound with a maximum of 10 silicon atoms per molecule and having at least 3 reactive groups selected from the class consisting of condensable groups, condensable atoms and mixtures thereof at pressures higher or lower than the surrounding atmosphere, and thereafter crosslinking the organopolysiloxane (1) which is present in the wood.

2. The process of claim 1, wherein the organopolysiloxane (1) contains from 1.90 to 2 SiC-bonded organic radicals per silicon atom and has an average molecular weight of at least 20,000 and the organic silicon compound (2) is present in an amount of from 30 to 75 percent by weight based on the total weight of organic silicon compound (2) and organopolysiloxane (1).

3. The process of claim 1 or 2, wherein the organopolysiloxane (1) contains condensable groups.

4. The process of claim 3, wherein the condensable groups are selected from the group consisting of hydroxyl groups and SiOC-bonded alkyl groups having up to 8 carbon atoms.

5. The process of claim 1 or 2, wherein the organopolysiloxane (1) contains SiC-bonded alkenyl groups.

6. A plastic wood which has been impregnated in accordance with the process of claim 1.

7. A plastic wood which has been impregnated in accordance with the process of claim 2.

* * * * *